UNITED STATES PATENT OFFICE.

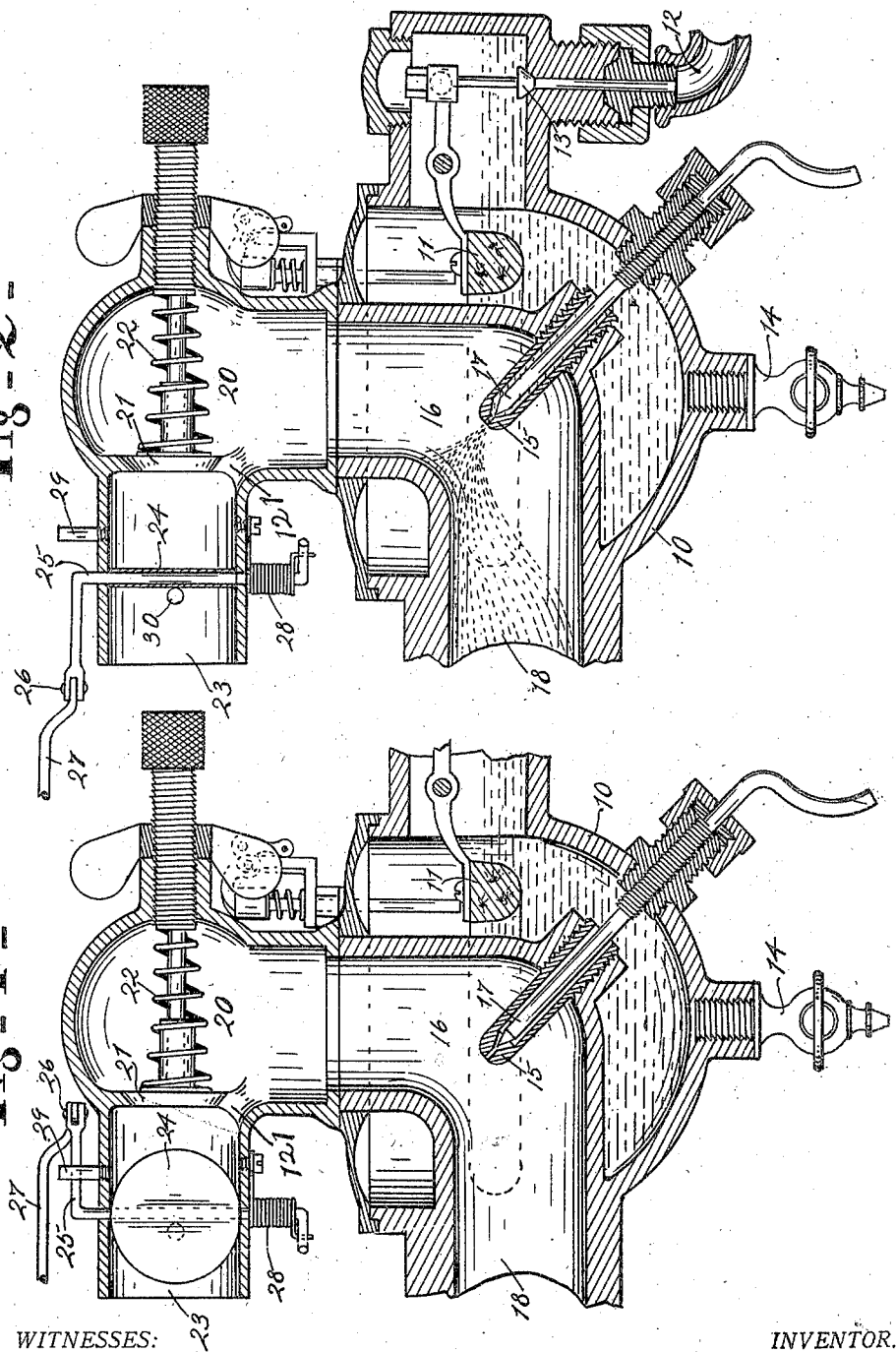

GARRETT W. HENRICKS, OF INDIANAPOLIS, INDIANA, ASSIGNOR, BY DIRECT AND MESNE ASSIGNMENTS, TO IMPROVED CARBURETER COMPANY, A CORPORATION OF INDIANA.

CARBURETER.

947,712. Specification of Letters Patent. Patented Jan. 25, 1910.

Application filed January 10, 1908. Serial No. 410,179.

*To all whom it may concern:*

Be it known that I, GARRETT W. HENRICKS, of Indianapolis, county of Marion, and State of Indiana, have invented a certain new and useful Carbureter; and I do hereby declare that the following is a full, clear, and exact description thereof, reference being had to the accompanying drawings, in which like numerals refer to like parts.

The object of this invention is to provide an improved construction of carbureters wherein the suction of the piston of the engine may be utilized in emergency for priming the cylinder of the engine with gasolene or fuel by temporarily closing the air inlet while starting the engine, especially during cold weather.

A feature of the invention consists in combining with the means for temporarily closing the air inlet, means for stopping or limiting the opening and closing movements of the emergency valve in the air inlet.

The full nature of this invention will be understood from the accompanying drawings and the following description and claims.

In the drawings Figure 1 is a central vertical section through the carbureter supplied with my improvement, showing the parts in normal operative position and the air valve in the normal position during use of the carbureter. Fig. 2 is the same showing the air valve temporarily closing the air inlet for priming the cylinder of the engine.

There appears in the drawings a float chamber 10 with a float 11 therein having a gasolene supply pipe 12, a valve 13 for controlling the admission of gasolene into the float chamber and which valve is controlled by the float 11.

14 is the waste outlet and 15 is the fuel inlet end of the mixing chamber 16, which fuel inlet is controlled by the needle valve 17. 18 is the outlet for the gas to the engine and, therefore, in direct communication with the engine.

20 is an air chamber which may be detachably connected with the part heretofore described, the inlet whereof is permanently controlled by a spring-pressed main valve 21, the tension of the spring 22 thereof being adjustable. 23 is an air inlet, which is only partially but never entirely closed by said valve 21, as there is a by-pass 121 leading by the valve 21 and below it, that is never closed, as appears in Figs. 1 and 2.

The foregoing mechanism is old so far as my invention is concerned. I provide in the air inlet 23 an emergency disk valve 24 on a crank shaft 25 extending diametrically through the air inlet tube 23 and having a crank 26 on its upper end from which means 27 extend to any convenient place for closing said emergency valve. The valve is held normally open by the spring 28, the stop 29 serving to limit the opening movement of the valve as shown in Fig. 1. The open position of the valve 24 is the normal position when the device is idle and when it is working. When, however, the engine is being started and especially in cold weather, the cylinder of the engine can be primed by closing the valve 24 to the position shown in Fig. 2, thus cutting off the supply of air and causing the engine practically to suck up or pump up fuel through chamber 16 and outlet 18 to the cylinder, whereupon the valve is immediately released for the immediate admixture of air with the fuel in the carbureter. A stop 30, here in the form of a pin extending through the side of the air tube 23, is provided for stopping the closing movement of the valve. When the part 27 is released the spring 28 immediately opens the valve to its normal position. It is thus seen that at the time of cranking the engine, the cylinder can be conveniently and easily primed instantly.

By the word "emergency" used herein in connection with the valve 24 is meant a valve to be used in the case of emergencies when the remaining valve and mechanism is insufficient to make the carbureter work. This valve 24 is not necessary for starting the engine ordinarily and except in warm weather and when the carbureter is in good condition, but in cold weather and on the occasion of very sudden changes in the wheather or when the fuel inlet is partially or totally clogged by some temporary obstruction, whether it be due to the weather or some other cause, an emergency then exists which is met and overcome by the emergency valve 24, for by closing it the fuel may be drawn through the fuel inlet and the engine started regardless of the cold or condition of the weather, or if there be a temporary obstruction even when the weather is not cold or changeable, it can be thus readily removed.

What I claim as my invention and desire to secure by Letters Patent is:

1. A carbureter provided with an air inlet passageway, a main valve for controlling the passage of air therethrough, which valve is adapted to yield to the pressure of the incoming air, an emergency valve located in said air inlet passageway and preceding said main valve, a spring for normally holding said emergency valve in an open position, and means for temporarily closing said emergency valve.

2. In a carbureter having an air inlet passage-way, a main valve for partially closing the inner end of said passage-way, a spring that normally holds said valve closed against the suction therethrough, an emergency valve in said inlet passage-way preceding said main valve, means tending to hold said emergency valve open, and means for temporarily closing said emergency valve, substantially as and for the purpose set forth.

3. In a carbureter having an air inlet passage-way, a main valve for partially closing the inner end of said passage-way, a spring that normally holds said valve closed against the suction therethrough, an emergency valve in said inlet passage-way preceding said main valve, means tending to hold said emergency valve open, means for temporarily closing said emergency valve, and means for stopping said emergency valve in its open and closed positions, substantially as and for the purpose set forth.

In witness whereof, I have hereunto affixed my signature in the presence of the witnesses herein named.

GARRETT W. HENRICKS.

Witnesses:
   V. H. LOCKWOOD,
   OLIVE BREEDEN.